(12) United States Patent
Heppe

(10) Patent No.: US 6,873,288 B2
(45) Date of Patent: Mar. 29, 2005

(54) ENHANCED GNSS RECEIVER

(76) Inventor: Stephen B. Heppe, 1011 Hutson Dr., Hood River, OR (US) 97031

( * ) Notice: Subject to any disclaimer, the term of this patent is extended or adjusted under 35 U.S.C. 154(b) by 0 days.

(21) Appl. No.: 10/381,670

(22) PCT Filed: Jun. 14, 2001

(86) PCT No.: PCT/US01/18946
§ 371 (c)(1),
(2), (4) Date: Jan. 22, 2004

(87) PCT Pub. No.: WO01/97407
PCT Pub. Date: Dec. 20, 2001

(65) Prior Publication Data
US 2004/0113837 A1 Jun. 17, 2004

Related U.S. Application Data
(60) Provisional application No. 60/211,492, filed on Jun. 14, 2000.

(51) Int. Cl.$^7$ ................................................ G01S 5/14
(52) U.S. Cl. .............................. 342/357.12; 342/357.15
(58) Field of Search ....................... 342/357.12, 357.15

(56) References Cited

U.S. PATENT DOCUMENTS

| | | | | |
|---|---|---|---|---|
| 5,343,209 A | * | 8/1994 | Sennott et al. | 342/357.02 |
| 5,398,034 A | * | 3/1995 | Spilker, Jr. | 342/357.02 |
| 5,663,734 A | * | 9/1997 | Krasner | 342/357.12 |
| 6,313,789 B1 | * | 11/2001 | Zhodzishsky et al. | 342/357.12 |

OTHER PUBLICATIONS

J. Selva, Subspace methods applied to multipath mitigation in a navigation receiver, IEEE Vehicular Technology Conference, vol. 4, p. 2077–2081, Sep. 1999.*

* cited by examiner

Primary Examiner—Thomas H. Tarcza
Assistant Examiner—F H Mull
(74) Attorney, Agent, or Firm—Blank Rome LLP

(57) ABSTRACT

An improved GPS or GNSS receiver can operate at low signal levels and in the presence of RF interference including multipath. Three separate technologies known in the prior art are integrated: a) vector tracking of multiple parameters in a multi-dimensional state space; b) fast correlation processing (107) of GPS or GNSS signals; and c) multiple signal characterization based on eigenvalue/eigenvector analysis of correlation matrices.

10 Claims, 1 Drawing Sheet

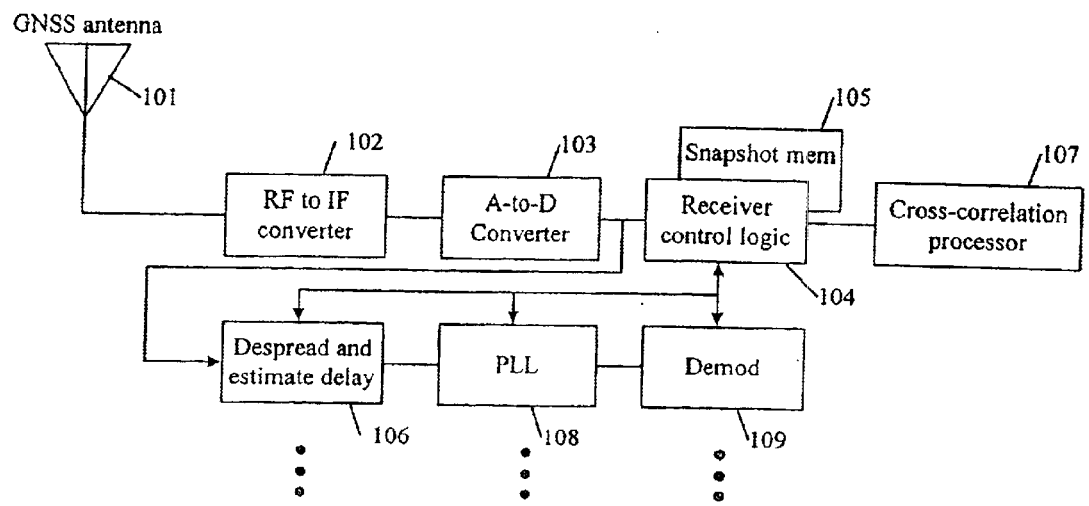

ENHANCED GNSS RECEIVER

REFERENCE TO RELATED APPLICATION

The present application claims the benefit of U.S. Provisional Application No. 60/211,492, filed Jun. 14, 2000, whose disclosure is hereby incorporated by reference in its entirety into the present disclosure.

FIELD OF THE INVENTION

The present invention is directed to the enhancement of Global Navigation Satellite System (GNSS) receiver performance.

BACKGROUND OF THE INVENTION

The Global Navigation Satellite System (GNSS) generically includes the Global Positioning System (GPS) operated by the United States, the Global Orbiting Navigation Satellite System (GLONASS) operated by the Russian Federation, and various other systems intended to increase the number of satellite- or ground-based ranging sources, or otherwise to augment the performance of user equipment operating with some or all of these systems.

The GPS and GLONASS, and certain other augmentations to GPS and GLONASS, operate in the portion of the radio spectrum above 1 GHz. GNSS ranging signals, received by typical user equipment located near the Earth surface, have power levels on the order of $10^{-16}$ Watt. A practical concern for users of these systems is signal attenuation by natural objects such as trees, and manmade objects such as buildings. When signals are strongly attenuated by intervening objects, they are more difficult to track and data modulated on these signals are more difficult to read without error. Strong attenuation can prevent successful operation of the user receiving equipment.

A conventional GNSS receiver performs three basic functions:

a) it estimates the code phase (pseudorange) for each of several ranging signals at one or several instants of time;

b) it demodulates navigation data transmitted by the ranging sources, which provide information as to the locations of said ranging sources at the instants of time at which the pseudorange measurements were made; and c) it computes the position of the receiving antenna by a process of triangulation, using the known locations of the ranging sources and the estimated pseudoranges to those sources.

A typical GNSS receiver tracks each of the several ranging signals separately, using for example an early/late gate Delay Lock Loop (DLL) implementation to estimate signal arrival time and for example a Costas-type Phase Lock Loop (PLL) to estimate signal carrier phase. The DLL typically despreads the ranging signal for the PLL, and the PLL provides a carrier reference for data demodulation. The DLL can lose lock at low signal-to-noise ratios; a typical performance level for desirable operation is in the range of 30 dBHz. The demodulator requires a reference oscillator "locked" to the incoming ranging signal. The PLL can also lose lock at low signal-to-noise ratios, and the demodulator can experience bit errors at low signal-to-noise ratios even when the phase-lock loop is stable. A typical performance level for desirable operation, for the PLL and also the demodulator, is in the range of 30 dBHz.

When the user receiver is shadowed from the transmitting ranging sources, for example by trees or manmade structures, signal level is reduced, tracking loops become unstable, and receiver performance can degrade. In many user environments, ranging signals also arrive by multiple reflected paths as well as a direct path. The signals arriving by reflected paths can "fool" the tracking loops and degrade the performance of the receiver.

One solution previously developed to mitigate low signal strength and tracking loop instability is known as vector tracking or Integrated Demodulator Navigation. That solution is taught in U.S. Pat. No. 5,343,209 to Sennott et al. In this scheme "[T]he coupled-tracking navigation receiver periodically measures carrier phase, carrier frequency, modulation phase, and carrier amplitude for all of the signals arriving at the receiving ports of the receiver and periodically estimates the present values of carrier phase, carrier frequency, and modulation phase for all of the received signals, the estimating process utilizing for each parameter estimate the parameter measurements for a plurality of the received signals properly combined in a statistically appropriate manner by taking into account the relative geometry of the line-of-sight paths, receiver clock time dynamics, and dynamics and motion constraints of the receiver platform, thereby obtaining better performance under poor signal reception conditions and more accurate estimates of carrier phase, carrier frequency, and modulation phase for each of the received signals than independent measurements alone could provide. It follows that these more accurate estimates of the basic signal parameters lead to more accurate estimates of platform position and attitude and the rates of change of these quantities."

Another solution, recently developed to mitigate low signal strength, is known as SnapTrack™. The Snaptrack concept is disclosed in U.S. Pat. Nos. 6,064,336, 6,061,018, 6,052,081, 6,016,119, 6,002,363, 5,999,124, 5,945,944, 5,884,214, and 5,874,914. It is also described in a technical article by Moeglein and Krasner, "An Introduction to SnapTrack™ Server-Aided GPS Technology." Snaptrack achieves high sensitivity, low time-to-first-fix and low power dissipation in comparison to a conventional GPS receiver by relying on aiding information provided by an external location server. The aiding information may consist of a stable carrier reference signal, satellite ephemeris information (i.e., so that the user receiver is not required to demodulate this information), and observation windows for the various ranging signals expected to be observable by the user receiver. Pseudorange information (essentially, relative arrival time estimates extracted by a ranging code cross-correlation process at the user receiver) is typically passed back to a remote location server for position estimation. However, if the navigation data associated with the ranging signals are made available to the mobile receiver, the position estimation function can be performed locally.

A characteristic of the Snaptrack concept is that the remote receiver does not "track" the ranging signals in the classical sense. Instead, the remote receiver performs a cross-correlation against a known ranging code within an observation window specified by the remote location server. The peak or peaks of the cross-correlation function within the observation window, for each ranging signal observed, is (are) used for position estimation either locally or at the remote location server. Since tracking in the classical sense is not performed, the Snaptrack receiver avoids the instability of a tracking circuit. This allows the overall position determination system to operate at a signal level that is substantially weaker than the level required by a conventional GPS receiver. However, the location server may need to provide new information regarding the desired observation windows, for each ranging signal, for each new position fix. If the Snaptrack receiver attempts to adjust the observation windows based on its current observations, it is essentially tracking the ranging signals and classical tracking instability may ensue.

One method known in the prior art, to accurately estimate parameters such as signal arrival time, is MUltiple SIgnal Characterization (MUSIC) described by Schmidt, Ralph Otto, 1981, "A Signal Subspace Approach to Multiple Emitter Location and Spectral Estimation" (Stanford University). An Iteratively CONvergent (ICON) improvement of MUSIC and similar algorithms, also known in the prior art, has been previously disclosed by the inventor (Heppe, Stephen B., 1989, "Iteratively Convergent Methods of Signal Characterization Based on Eigenspace Analysis" (The George Washington University)).

SUMMARY OF THE INVENTION

This invention describes a method and apparatus for an improved GNSS receiver which incorporates key features of vector tracking, Snaptrack, MUSIC and ICON in order to provide robust performance with minimal support by an external location server. In a preferred embodiment these techniques are intended to generate a multitude of position fixes over a span of time.

The invention offers advantages beyond those offered by each of the known techniques individually. The invention is more than the sum of its parts because of the tight coupling between the way observations are performed, on the one hand, and the vector tracking used to keep the observation windows appropriately centered on the estimated signal arrival times, on the other hand. Snaptrack addresses the observation problem but does not address the tracking problem at all. Even if it tried to track, it would have difficulty since the observations are very "noisy". Vector tracking is an ideal solution for maintaining navigation with noisy signals, and once navigation is maintained, position and velocity estimates for the host platform can be used to re-position the observation windows with much greater confidence. This is particularly beneficial when there are multiple reflected signals present, which can fool a normal tracker but are less problematic for a vector tracker. Vector tracking was originally developed for tracking in low SNR conditions, but was originally conceived to drive a standard set of trackers (ie, by driving the equivalent error signals for the DLLs and PLLs). As a subtle detail the vector tracking is eased since the cross-correlation processing from Snaptrack clearly identifies the various peaks associated with the direct and reflected signals, so issues associated with false lock on a strong reflected signal (or a strong refracted signal), when the direct is weak, are minimized. So the invention is not really Snaptrack and not really vector tracking, at least as conceived by their respective inventors—it is a new thing which combines elements of both but is not a full implemention of either one. The MUSIC and ICON techniques add further modifications relative to Snaptrack since these techniques imply a specific method for processing the stored data, which is different from a simple cross-correlation process. In short, there is synergy among the various components of the invention.

BRIEF DESCRIPTION OF DRAWINGS

The FIGURE illustrates an integrated receiver according to the present invention, which incorporates vector tracking, Snaptrack, MUSIC and ICON techniques in order to achieve high accuracy and tracking stability for strongly attenuated signals with minimal reliance on external aiding information.

DETAILED DESCRIPTION OF THE INVENTION

The FIGURE illustrates a preferred embodiment of the present invention. Signals from the GNSS ranging sources, modulated with navigation data, are received by a GNSS antenna 101, passed to an RF-to-IF converter 102, and digitized by an analog-to-digital converter 103. The digitized samples are passed to the receiver control logic 104 where selected epochs of said samples may be stored in snapshot memory 105, and also passed to a despreader and delay estimator 106. The cross-correlation processor 107 operates on a selected epoch of the digitized samples stored in snapshot memory 105, under the control of the receiver control logic 104, and determines the one or several correlation peaks associated with each ranging signal present at the receiver input. Typically there will be multiple correlation peaks identified. Only the first correlation peak is intended to be used in a navigation solution, although the first correlation peak may not be the strongest of the several peaks identified. For certain types of users, the relative arrival times and signal strengths of the various correlation peaks will change slowly over time. The arrival times and strengths of the various correlation peaks are returned to the receiver control logic 104.

The digitized samples generated by the ADC 103 are also passed to a channel bank comprising one despreader and delay estimator 106, one phase-lock-loop (PLL) 108 and one demodulator 109 for each ranging signal to be tracked. In a typical GNSS receiver known to the prior art, the despreader and delay estimator 106 is implemented as a Delay Lock Loop (DLL) and would be commanded by the receiver control logic 104 to correlate against a single known ranging code; the despreader and delay estimator would track this code as a scalar tracking loop. A DLL operates by generating a local reference of a selected ranging code, and then forming three copies of this local reference with fixed time offsets between them—these three copies are called the early, prompt and late signals. All three signals are clocked at a common rate and correlated against copies of the incoming sampled data provided by the ADC 103 (in some implementations these data may be passed through the receiver control logic 104). The prompt signal leads to a despread version of the desired ranging signal which is passed to the PLL and demodulator; the early and late signals lead to error signals which are accumulated and dumped at regular intervals (typically 20 msec for GPS and GLONASS) and used to drive the tracking logic of the DLL.

In the present invention the despreader and delay estimator constructs a modified local reference based on the data returned by the correlation processor 107 to the receiver control logic 104. Two implementations are foreseen:

a) the modified local reference is intended to correlate the first identified peak and null out subsequent peaks; and b) the modified local reference is intended to combine the various identified peaks in the manner of a RAKE receiver.

In either case, the despreader and delay estimator forms a prompt output which is passed to the PLL 108, and also returns error signals from the early and late gates to the receiver control logic 104. Because the delayed versions of the desired signal are either nulled or summed by the action of the modified despreader and delay estimator, the prompt signal is more stable and useful for subsequent processing and the error signals are more accurate and stable for tracking. However, rather than use the error signals for scalar tracking of the signal arrival time, the error signals are returned to the receiver control logic 104 where they are used in a vector tracking loop for signal tracking constrained by achievable overall platform dynamics relative to the ranging sources. The estimated platform dynamics, along with known ranging source dynamics and possibly other data, are used to determine a feedback control signal to adjust the timing of the DLL. The vector tracking loop implementation is more stable than a scalar tracking loop, and can maintain track at lower signal-to-noise ratio levels.

The phase estimator 108 can be implemented as a traditional PLL or as another part of the vector tracking implementation involving estimation of receiver platform dynamics by the receiver control logic 104. In either case, it is used to estimate Doppler frequency and provide a stable carrier reference for data demodulation. The demodulator is envisioned as a standard demodulator known to the prior art.

In a second embodiment of the present invention, the modified despreader and delay estimator 106 is further modified to eliminate the early and late signal channels and implement a super-resolution technique such as MUSIC or ICON (or similar) on the remaining prompt signal channel (which is still passed to the PLL and demodulator for further processing). The prompt signal channel has already been processed to account for the most significant multipath reflected signals of the selected ranging signal; however, the undesired ranging signals present at the input (and possibly other forms of radio frequency interference) can potentially degrade the estimate of arrival time. MUSIC, ICON and similar super-resolution techniques allow for accurate arrival time estimation in a multi-signal environment. ICON is particularly desirable in cases where the desired signal is received at a lower power level than other undesired signals, since it can null-out undesired signals and achieve the Cramer-Rao bound on estimation accuracy for the desired signal. These techniques tend to perform poorly in the presence of correlated signals (as represented by reflected multipath signals); however, the prior processing by the modified despreader, under the control of the receiver control logic 104 based on signal component arrival time estimates generated by the cross-correlation processor 107, substantially eliminates this issue as a significant cause of degradation.

In one embodiment of the present invention, initialization data are received over a communications channel 110 according to the manner disclosed by Snaptrack. However, the present invention can achieve signal acquisition autonomously with sufficient time for cross-correlation processing and hypothesis testing.

In one embodiment of the present invention, the arrival time estimates generated by the cross-correlation processor 107 are used directly by the vector tracking loop implementation to determine platform location and dynamics.

While preferred embodiments of the invention have been set forth in detail, those skilled in the art will recognize that other embodiments can be realized within the scope of the present invention. Therefore, the present invention should be construed as limited only by the appended claims.

I claim:

1. A GNSS receiver for tracking desired ranging signals, the GNSS receiver comprising:
   a) a vector tracking loop for tracking the desired ranging signals in accordance with estimated direct and reflected signal arrival times of the desired ranging signals; and
   b) cross correlation processing means for estimating the direct and reflected signal arrival times and for supplying the estimated direct and reflected signal arrival times to the vector tracking loop.

2. The GNSS receiver of claim 1, further comprising DLL means for forming a local replica of at least one of the desired ranging signals in accordance with a plurality of reflected signals identified by the cross correlation processing means.

3. The GNSS receiver of claim 2, further comprising means for estimating an arrival time of said at least one of the desired ranging signals using a super-resolution technique.

4. The GNSS receiver of claim 3, wherein the super-resolution technique is MUSIC.

5. The GNSS receiver of claim 3, wherein the super-resolution technique is ICON.

6. A GNSS receiver for tracking desired ranging signals, the GNSS receiver comprising:
   a) a vector tracking loop for tracking the desired ranging signals in accordance with estimated direct and reflected signal arrival times of the desired ranging signals and in accordance with initialization and acquisition aiding data;
   b) cross correlation processing means for estimating the direct and reflected signal arrival times and for applying the direct and reflected signal arrival times to the vector tracking loop; and
   c) means for receiving the initialization and acquisition aiding data via an external communications system and for applying the initialization and acquisition aiding data to the vector tracking loop.

7. The GNSS receiver of claim 6, further comprising DLL means for forming a local replica of at least one of the desired ranging signals in accordance with a plurality of reflected signals identified by the cross correlation processing means.

8. The GNSS receiver of claim 7, further comprising means for estimating an arrival time of said at least one of the desired ranging signals using a super-resolution technique.

9. The GNSS receiver of claim 8, wherein the super-resolution technique is MUSIC.

10. The GNSS receiver of claim 8, wherein the super-resolution technique is ICON.

* * * * *